No. 622,907. Patented Apr. 11, 1899.
R. P. WEED.
WASHING MACHINE.
(Application filed Feb. 6, 1899.)
(No Model.)
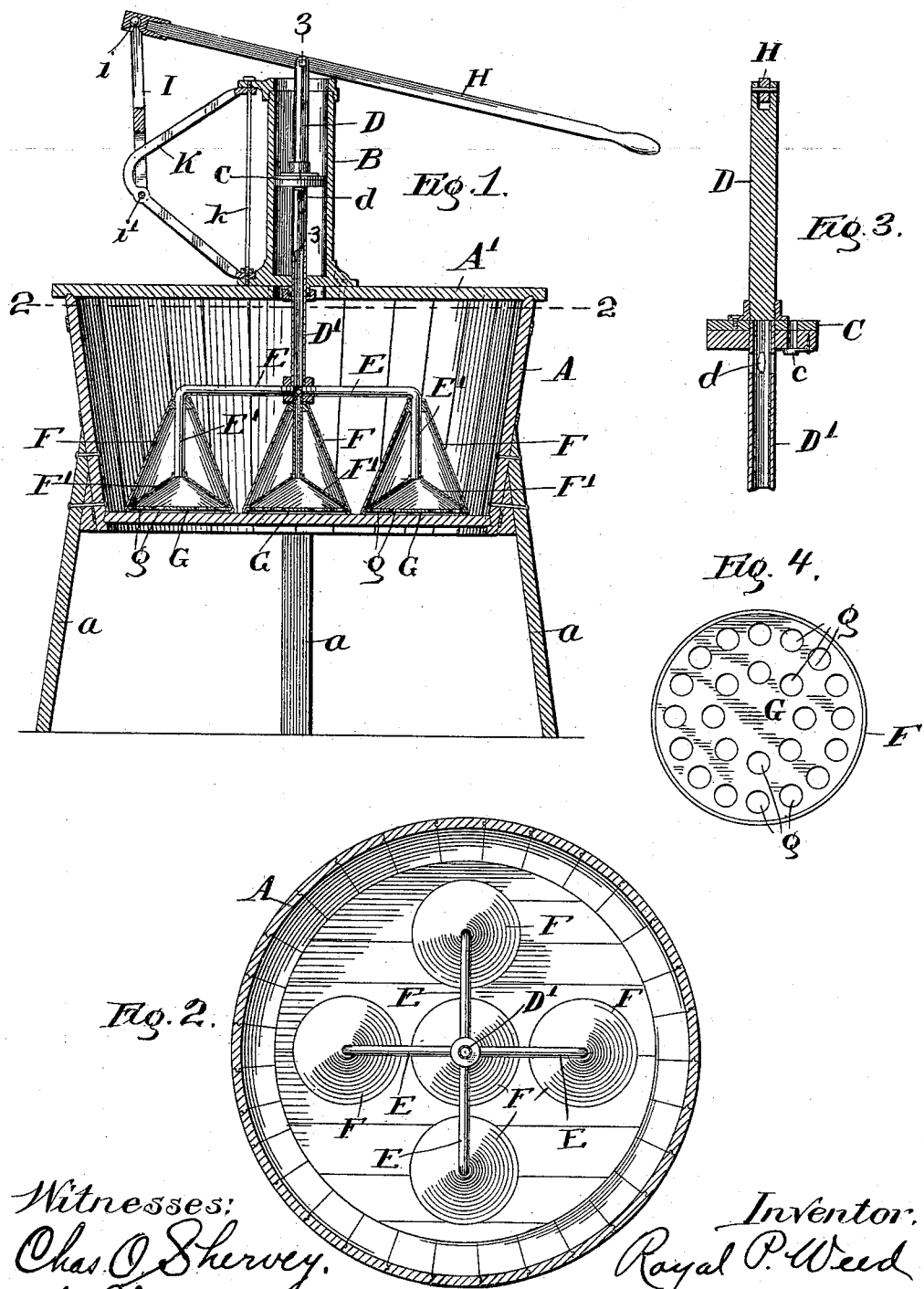

UNITED STATES PATENT OFFICE.

ROYAL P. WEED, OF LANARK, ILLINOIS.

WASHING-MACHINE.

SPECIFICATION forming part of Letters Patent No. 622,907, dated April 11, 1899.

Application filed February 6, 1899. Serial No. 704,726. (No model.)

*To all whom it may concern:*

Be it known that I, ROYAL P. WEED, a citizen of the United States of America, residing at Lanark, in the county of Carroll and State of Illinois, have invented certain new and useful Improvements in Washing-Machines, of which the following is a specification.

My invention relates to improvements in washing-machines, its object being to provide a simple and practical machine in which the cleansing of the articles to be washed may be effected principally by forcing air and water through them by means of an air-pump and suitable air-distributing mechanism.

The invention is fully described and explained in this specification and shown in the accompanying drawings, in which—

Figure 1 is a central vertical section of a complete machine embodying my improvements. Fig. 2 is a transverse section through the line 2 2 of Fig. 1, the view being downward, so that the principal parts are shown in top plan. Fig. 3 is an enlarged central vertical section of a portion of the air-pump, the plane of section being through the line 3 3 of Fig. 1; and Fig. 4 is a bottom plan of one of the funnel-shaped air-distributers of the mechanism.

In the views, A is a tub of any suitable form and size provided with supporting-legs $a$ and a cover or central cross-bar A', which may be secured to the tub in any desired way. On the cover or cross-bar A' is rigidly fastened the cylinder B of an air-pump, and in this cylinder moves freely up and down a plunger C, provided with a valve $c$, Fig. 3, adapted to open when the plunger moves upward. This plunger is provided with a closed upwardly-extending rod D and a downwardly-extending tubular stem D', formed with perforations $d$ immediately below the plunger, these perforations being adapted to admit air to the tubular stem. The valve-stem passes through a suitable stuffing-box or other packing at the lower end of the cylinder and extends downward into the tub, its lower end being provided with a spider made up of horizontal tubes E E, preferably at right angles to each other and all opening into the tube D'. Each of the tubular arms E E has at its outer end a downward extension E', lying within and supporting a preferably conical air-distributer F, each of the air-distributers being provided with a bottom plate G, formed with suitable perforations $g$. The lower end of each of the extensions E' may open directly into the space within the corresponding conical air-distributer; but I prefer to provide each extension at its lower end with a second cone F', into which it opens, as clearly indicated in Fig. 1 of the drawings, the purpose of this second cone being to strengthen the air-distributer as well as to contract the space which receives the compressed air, and thus increases the force and quickness of its expulsion.

To the top of the upward closed stem D of the plunger is pivoted a lever or handle H, free to oscillate in a vertical plane, and one end of this lever or handle is connected by means of a ball-and-socket joint $i$ with the upper end of a link I, the lower end of which is connected by means of a transverse pivot $i'$ to the outer end of a laterally-oscillating bracket K, the inner end or edge of which is connected with the pump-cylinder by means of a vertical pivot $k$. When the lever or handle H is in the vertical plane of the bracket—that is, when the bracket is radial with reference to the axis of the cylinder—the link I is in the position shown in Fig. 1 of the drawings; but it is evident that the handle may be swung about the axis of the cylinder within certain limits of movement, thereby bringing the bracket out of its normal or radial plane, and this movement must necessarily swing the upper end of the link outward from the position shown in Fig. 1 and must at the same time rotate the link to a corresponding extent with reference to the lever. It is to provide for these varying relations of the lever and link that they are connected by means of a ball-and-socket joint instead of a simple transverse pivot, and through the use of this connection I have made it possible to give the lever a horizontal as well as a vertical oscillation. In the operation of the machine the vertical oscillation of the lever evidently forces air from the cylinder-space below the plunger into the tubular valve-stem and thence through the arms E E, extensions E' E', and perforated cone-bases G G into the hub and through any articles of clothing with which the bases of the cones are in contact. On the other hand, the horizontal oscillation of the lever causes corresponding oscillation of the arms E E and air-distributers F F, and thus not only produces the mechanical agitation of any material in the tub, but also brings the distributers into new relations to the articles to be washed. I have found in practice that the combination of these movements is extremely effective, and the connections of the parts of my machine are such as to permit such operation as includes either or both of these movements without any binding or unnecessary strain of the parts.

I claim as new and desire to secure by Letters Patent—

1. In a washing-machine, the combination with a suitable tub, of an air-pump cylinder, supported on the tub, a suitable plunger moving in the cylinder and provided with upwardly and downwardly extending stems, the downwardly-extending stem being tubular, an operating-lever pivoted to the upwardly-extending stem and having one of its ends supported on a suitable fulcrum, tubular arms connected with the lower end of said downwardly-extending tubular stem and preferably conical air-distributers connected with the outer ends of said arms and provided with perforated bottom plates, the vertical oscillation of said lever being adapted to force air through said tubular plunger-stem and the perforated bottom plates of the conical air-distributers; substantially as shown and described.

2. The combination with the tub, the pump-cylinder supported thereon, the plunger moving in the cylinder and having the closed upper stem and the tubular lower stem passing through a packing at the bottom of the cylinder, of the lever pivoted to the upper stem and fulcrumed at one end on an oscillating link, the radial tubular arms connected with the tubular lower stem, the downward tubular extensions at the ends of said arms, the outer cones supported by said extensions, the inner cones lying within the outer cones and communicating with the ends of the extensions, and the perforated bottom plates, each of which closes the mouth of the inner and outer cones of the corresponding distributer.

3. The combination with the tub, the pump-cylinder supported thereon, the plunger moving therein and having the closed upper stem and tubular lower stem, of a suitable air-distributer having a perforated bottom and connected with said tubular lower stem, a horizontally-oscillating bracket, an approximately vertical link pivoted at its lower end to said bracket, and an operating-lever pivoted to the top of the upper plunger-stem and connected at one end with the upper end of said link, by means of a ball-and-socket joint.

4. The combination with the tub, the cylinder supported thereon, the plunger, moving in the cylinder and having the stems, D, D', the spider made up of the arms, E, E, and the air-distributer connected with the ends of said arms, of the horizontally-oscillating bracket, K, the link, I, pivoted at its lower end to said bracket and the lever, H, pivoted to the upper plunger-stem and connected at one end with the upper end of the link, I, by means of a ball-and-socket joint.

In witness whereof I have hereunto set my hand at Lanark, in the county of Carroll and State of Illinois, this 2d day of February, A. D. 1899.

ROYAL P. WEED.

Witnesses:
JOSIAH S. WILSON,
H. F. WULKE.